(12) United States Patent
Piazzesi

(10) Patent No.: US 8,310,846 B2
(45) Date of Patent: Nov. 13, 2012

(54) SINGLE SECONDARY RECTIFICATION MULTI-OUTPUTS FLYBACK CONVERTER ADAPTED TO MINIMIZE THE NUMBER OF COMPONENTS

(75) Inventor: Mauro Piazzesi, Terranuova Bracciolini (IT)

(73) Assignee: Power-One Italy S.p.A. (IT)

( * ) Notice: Subject to any disclaimer, the term of this patent is extended or adjusted under 35 U.S.C. 154(b) by 397 days.

(21) Appl. No.: 12/451,682

(22) PCT Filed: May 30, 2007

(86) PCT No.: PCT/IT2007/000380
§ 371 (c)(1),
(2), (4) Date: Nov. 24, 2009

(87) PCT Pub. No.: WO2008/146314
PCT Pub. Date: Dec. 4, 2008

(65) Prior Publication Data
US 2010/0165670 A1    Jul. 1, 2010

(51) Int. Cl.
*H02M 3/335* (2006.01)
(52) U.S. Cl. .................. 363/21.14; 363/21.12
(58) Field of Classification Search ............. 363/21.06, 363/21.12, 21.14, 89, 127
See application file for complete search history.

(56) References Cited

U.S. PATENT DOCUMENTS

| | | | |
|---|---|---|---|
| 5,508,903 A | 4/1996 | Alexndrov | |
| 5,740,026 A * | 4/1998 | Karol | 363/86 |
| 6,307,758 B1 * | 10/2001 | Geren | 363/21.15 |
| 6,330,169 B2 * | 12/2001 | Mullett et al. | 363/16 |
| 6,342,737 B1 * | 1/2002 | Brodeur | 307/87 |
| 6,434,026 B1 * | 8/2002 | Malik et al. | 363/21.14 |
| 6,549,432 B1 * | 4/2003 | Giannopoulos et al. | 363/21.14 |
| 6,809,939 B1 * | 10/2004 | Yang | 363/21.14 |
| 2006/0268586 A1 * | 11/2006 | Mikulenka et al. | 363/21.14 |

FOREIGN PATENT DOCUMENTS
EP    1367706    3/2003
* cited by examiner

*Primary Examiner* — Adolf Berhane
*Assistant Examiner* — Gary Nash
(74) *Attorney, Agent, or Firm* — Stetina Brunda Garred & Brucker

(57) ABSTRACT

The present application concerns a multi-output synchronous Flyback converter. The Flyback converter comprises a primary controlled switch (24), a driver circuit (26), a transformer and a feedback circuit (27). The secondary side of the converter comprises a plurality of secondary windings (29, 30, 31), a plurality of controlled rectifiers (32, 33, 34), and a control circuit (35) adapted to sense the current and/or the voltage related to one of said controlled rectifiers and to generate a control signal for all said controlled rectifiers.

7 Claims, 3 Drawing Sheets

PRIOR - ART

SINGLE SECONDARY RECTIFICATION MULTI-OUTPUTS FLYBACK CONVERTER ADAPTED TO MINIMIZE THE NUMBER OF COMPONENTS

This application is a 371 of PCT/IT2007/000380 May 30, 2007.

FIELD OF THE INVENTION

The present invention relates to the field of electronic power converters. In particular it refers to the field of so-called "flyback" converters.

STATE OF THE ART

Flyback converters are DC to DC converter with a galvanic isolation between the input and the output(s). Technically, the flyback converter is derived from the buck-boost converter by splitting its inductor to form a transformer, so that the voltage ratios are multiplied and the additional advantage of isolation is provided.

To convert the higher input DC voltage—coming, for example, from mains rectification or from telecom −48 V voltage supply bus—to lower, multiple positive output DC voltages, flyback converters are often the best approach at low to medium powers up to 250 W.

In a flyback converter, the output voltage can be configured to have any polarity and amplitude with respect to the input voltage. Also, multiple outputs are readily available just by adding secondary windings to the transformer.

With reference to FIG. 1 a basic schematic of a flyback converter is displayed. The operating principle of flyback converters is very simple: basically, the energy is stored in the transformer during the ON phase of the primary side switch and is released to the output during its OFF phase. When the primary switch is on (ON phase), the primary winding of the transformer is directly connected to the input voltage source and, correspondingly, the magnetic flux in the transformer core increases. The voltage across the secondary winding 10 is negative, and the diode 12 is in off-state since the voltage drop across its terminals is negative. The output capacitor 13 supplies energy to the output load 14. When the switch 11 is off (OFF state), the energy previously stored in the transformer 10 is transferred, through the diode 12, to the output of the converter.

For controlling of the output voltage level, a proportional voltage picked up from a separate sense winding can be used. More often, however, the secondary voltage is compared, through an error amplifier 15, to a voltage reference and the resulting control signal is eventually fed back to the controller 16 through an optocoupler 17—to maintain isolation between primary and secondary—in order to close the regulation loop and maintain output voltages within the required tolerances.

In the vast majority of applications of this kind of converters, multiple voltage outputs are present. This feature is often required by the need of supplying all the different sections of the electronic apparatuses wherein flyback converters normally operate, such as TV set, Video recorders, PCs, Set Top Boxes, DVD players and recorders etc. In this case, each output section of the flyback converter is provided with a transformer secondary winding and with a rectifier device like, for example, a diode.

Due to the growing demand for energy saving, size and cost reduction, one of the fundamental requirements of power supplies is high efficiency, which means that the amount of power dissipated inside the converter must be kept the lowest possible, in order to minimize the input power needed to provide the required amount of output power and to allow the use of smaller and more cost effective components.

One of the most important causes of power dissipation inside a flyback converter is related to the output rectifying diodes and is roughly proportional to the peak reverse voltage, to the peak reverse recovery current and the operating switching frequency.

Several techniques have been developed to reduce the switching losses related to the output rectifying diodes. One of the most employed concerns the use of controlled switches in place of the usual rectifying diodes. The use of controlled switches, such as power Mosfets and the like, allows minimizing the amount of the switching losses by optimizing, through suitable driving and control, the switching phase of the output rectifiers. Power mosfets are often employed for this purpose, and they are controlled by driving circuits which normally sense their voltage or current and provide the necessary gate driving signals to have smooth, loss minimizing commutations. Dedicated control ICs have been developed which are adapted to sense the voltage drop across the drain and the source terminal of the power mosfet switch and generate the gate driving signal to manage the ON/OFF and OFF/ON transitions in order to minimize switching losses. Another technique for limiting switching losses requires the use of suitable current transformers, adapted to sense the switch current and generate the control signal for the driving stage of the switch itself in order to accomplish an optimized and losses—reducing transition.

The above described solutions are often implemented in state-of-the-art single output flyback converters, but when the flyback converter is provided with multiple outputs, the need for multiple switching control circuit—one for each secondary output rectifier—reduces the cost-effectiveness of such a solution.

The scope of the present invention is to introduce a new multi-output flyback converter topology which minimizes the number of components required to control the secondary switches in order to minimize switching losses while maintaining the cost low.

SUMMARY OF THE INVENTION

The object of the present invention concerns a switching converter of the so-called "flyback" type characterised by multiple voltage outputs provided with active rectification circuits adapted to minimize the number of required components.

DETAILED DESCRIPTION OF THE INVENTION

Figure 1:
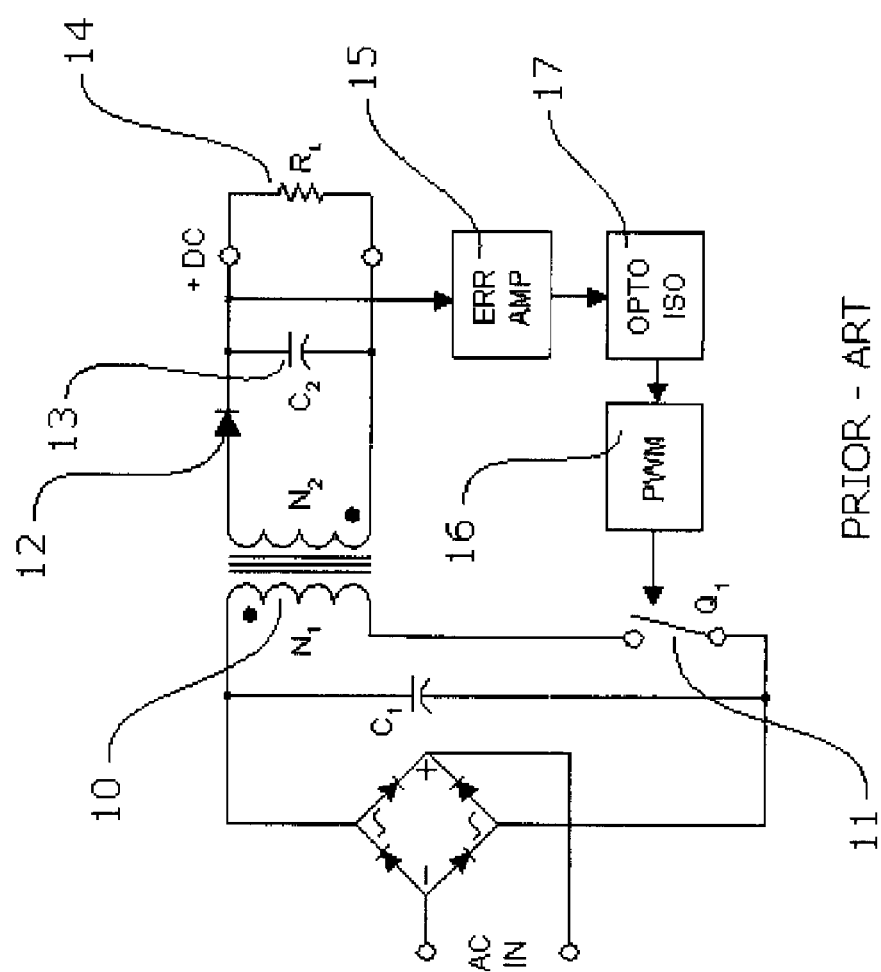
FIG. 1 shows a state-of-the-art flyback voltage converter.
Figure 2:
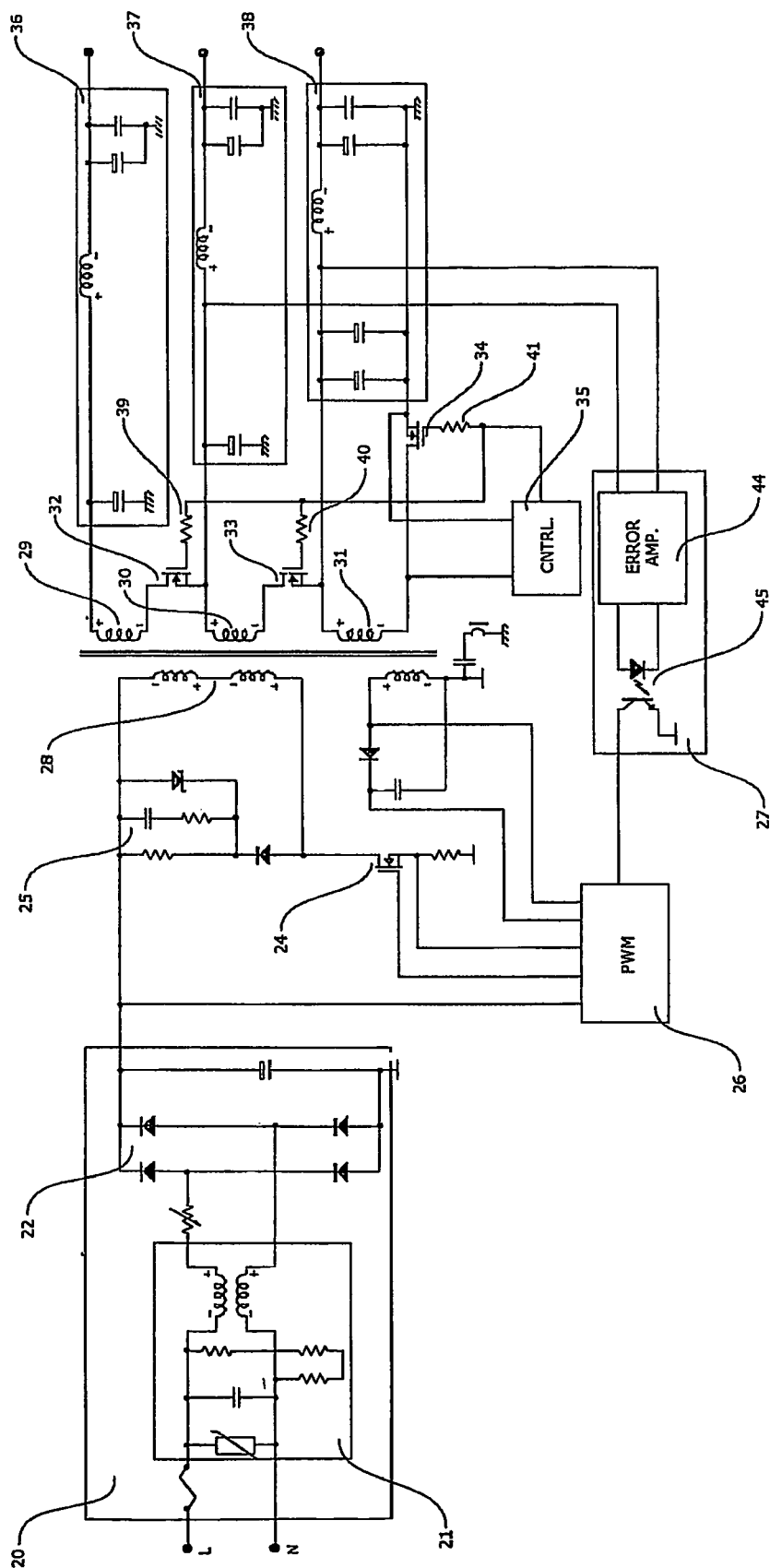
FIG. 2 shows a first preferred embodiment of the converter according to the present invention.

With reference to FIG. 2, a schematic of a first preferred embodiment of the flyback converter according to the present invention is displayed.

The primary section of said flyback converter comprises an input circuit 20, preferably comprising: a voltage or current source, at least one input filter 21 and a rectifier diode bridge 22 in case an AC input voltage is present; a primary switching circuit 23, preferably comprising at least a semiconductor controlled switch—such as a power mosfet 24—and related snubbering means 25; a driver circuit 26 providing the necessary gate driving signal for said power mosfet; a feedback circuit 27, associated to said driver circuit 26 and adapted to produce a feedback signal for the regulation of the output of said converter, a primary winding of a transformer 28, associated to said mosfet transistor 24. Said feedback circuit 27 preferably comprising means of sensing a voltage proportional to the converter output voltage, an error amplifier 44 and an optoisolator 45.

The secondary section of said flyback converter comprises a plurality of secondary windings belonging to said transformer; a plurality of controlled rectifiers, preferably power mosfets, associated to said secondary windings; a control circuit 35 adapted to sense the current and/or the voltage related to one of said controlled rectifiers and to generate a control signal for said controlled rectifiers; a plurality of output filters associated to each of said secondary windings and said controlled rectifiers, preferably comprising at least one capacitor and at least one inductor.

In a first preferred embodiment of the present invention, said control circuit 35 adapted to sense the current and/or the voltage related to said controlled rectifiers comprises a dedicated integrated circuit adapted to sense the voltage drop across one of said controlled rectifiers and to provide the control signal for said controlled rectifiers; said secondary windings are connected in series with each other through said controlled rectifiers and the secondary winding at lowest voltage is connected to ground through one of said controlled rectifiers. Examples of said dedicated integrated circuit for controlling the secondary side active rectifiers are available commercial products of several semiconductor producers such as STSR30™ by STMicroelectronics™ or IR1167™ by International Rectifier™.

In greater detail and with reference to the enclosed FIG. 2, said plurality of secondary windings comprise three secondary windings 29, 30, 31 and said plurality of active switches comprise three power mosfets 32, 33, 34. The first of said three secondary windings, 29 has a first terminal connected to the first of said output filters, 36 and a second terminal connected to the drain terminal of the first of said power mosfets 32; the second of said three secondary windings, 30 has a first terminal connected to the second of said output filters 37 and to the source terminal of the first of said power mosfets 32 and a second terminal connected to the drain terminal of the second of said power mosfets 33; the third of said three secondary windings, 31 has a first terminal connected to the third of said output filters 38 and to the source terminal of the second of said power mosfets 33 and a second terminal connected to the drain terminal of the third of said power mosfets 34, the source terminal of the third of said power mosfets 34 being connected to the ground reference terminal of the circuit. Said control circuit 35 is further associated to the third of said power mosfets 34—in order to sense the voltage drop across its drain and source terminals—and to the gate terminals of said first, second and third power mosfets 32, 33, 34 in order to drive them with its output control signal. Preferably said power mosfets 24, 32, 33, 34 are provided with gate resistors 39, 40, 41 in order to limit the gate input current at turn-on.

Figure 3:
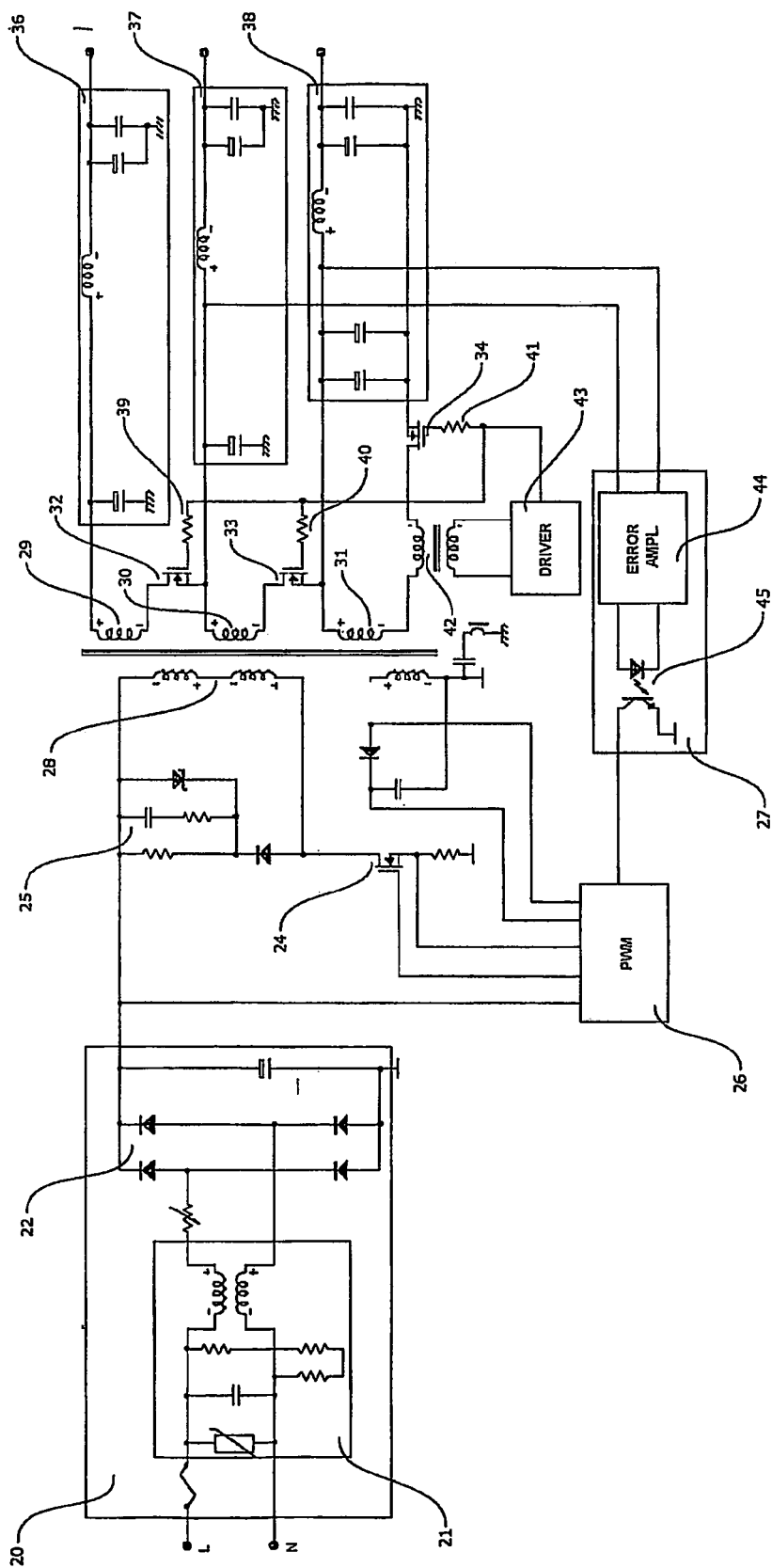
FIG. 3 shows a second preferred embodiment of the converter according to the present invention.

In a second preferred embodiment of the present invention, depicted in FIG. 3, said control circuit 35 is no longer present and it is replaced by a current transformer 42 associated to one of said controlled rectifiers and adapted to read the related current and a control circuit 43 adapted to produce the driving signal for everyone of said controlled rectifiers. The primary winding of said current transformer 42 is connected between the second terminal of the third of said three secondary windings, 31 and the drain terminal of the third of said power mosfets 34. The secondary winding of said current transformer 42 is connected to the input of said driver circuit 43 and the output of said driver circuit 43 is connected to the gate terminals of said three power mosfets 32, 33, 34.

In a further preferred embodiment of the present invention, said secondary windings 29, 30, 31 are adapted to provide an output DC voltage after rectification of, respectively, 12V, 5V and 3.3V.

The flyback converter according to the present invention allows minimizing dramatically the secondary circuit losses due to diode rectification, which normally affect state-of-the-art flyback converters. A single control and driver circuit is employed to drive up to three secondary synchronous rectifier mosfets thus reducing the number of the components and maximizing the overall efficiency of the flyback converter with up to three output voltages as normally requested to power up the vast majority of current electronic equipment.

The invention claimed is:

1. Flyback switching converter comprising: an input circuit; a primary switching circuit comprising at least one semiconductor controlled switch; a driver circuit providing the necessary gate driving signal for said semiconductor controlled switch; a feedback circuit associated to said driver circuit and adapted to produce a feedback signal for the regulation of an output of said converter; a transformer comprising a primary winding and a plurality of secondary windings; a plurality of controlled rectifiers associated to said secondary windings; a plurality of output filters each one of which is associated to one of said controlled rectifiers; an integrated control circuit adapted to sense the voltage drop across one of said controlled rectifiers and to produce a driving signal for each one of said controlled rectifiers characterized in that said plurality of secondary windings comprises at least two secondary windings and said plurality of controlled rectifiers comprises at least two mosfet transistors, a first of said at least two secondary windings, having a first terminal connected to a first of said output filters, and a second terminal connected to a drain terminal of a first of said at least two power mosfets; a second of said at least two secondary windings, having a first terminal connected to a second of said output filters and to a source terminal of the first of said at least two power mosfets and a second terminal connected to a drain terminal of a second of said at least two power mosfets; the source terminal of the second of said at least two power mosfets being connected to a ground reference terminal of the circuit; said control circuit being associated to the second of said at least two power mosfets in order to sense the voltage drop across its drain and source terminals—and to the gate terminals of said first and second power mosfets in order to drive them with its output control signal.

2. Flyback switching converter according to claim 1 wherein said plurality of secondary windings comprises three secondary windings and said plurality of controlled rectifiers comprises three mosfet transistors, a first of said three secondary windings, having a first terminal connected to the first of said output filters, and a second terminal connected to the drain terminal of the first of said power mosfets; a second of said three secondary windings, having a first terminal connected to the second of said output filters and to the source terminal of the first of said power mosfets and a second terminal connected to the drain terminal of the second of said power mosfets; a third of said three secondary windings having a first terminal connected to a third of said output filters and to the source terminal of the second of said power mosfets and a second terminal connected to a drain terminal of a third of said power mosfets, a source terminal of a third of said power mosfets being connected to the ground reference terminal of the circuit; said control circuit being associated to the third of said power mosfets—in order to sense the voltage drop across its drain and source terminals—and to the gate terminals of said first, second and third power mosfets in order to drive them with its output control signal.

3. Converter according to claim 1 wherein said input circuit comprises: a voltage or current source, at least one input filter and a rectifier diode bridge.

4. Converter according to claim 1 wherein said at least semiconductor controlled switch comprised in said primary switching circuit, comprises a mosfet transistor.

5. Converter according to claim 4 wherein said mosfet transistor is associated to suitable snubber means.

6. Converter according to claim 1 wherein said feedback circuit comprises means of sensing a voltage proportional to the converter output voltage, an error amplifier and an optoisolator.

7. Converter according to claim 1 wherein said at least two mosfets transistors are provided with gate resistors.

* * * * *